March 13, 1956     H. H. GORRIE ET AL     2,737,963

CONTROL SYSTEMS

Filed May 22, 1952     5 Sheets-Sheet 1

INVENTORS
HARVARD H. GORRIE
AND JACK F. SHANNON
BY
Raymond W. Junkins
ATTORNEY

INVENTORS
HARVARD H. GORRIE
AND JACK F. SHANNON
BY
Raymond D. Junkins
ATTORNEY

March 13, 1956  H. H. GORRIE ET AL  2,737,963
CONTROL SYSTEMS

Filed May 22, 1952  5 Sheets-Sheet 3

INVENTORS
HARVARD H. GORRIE
AND JACK F. SHANNON
BY
Raymond W. Junkins
ATTORNEY

March 13, 1956     H. H. GORRIE ET AL     2,737,963
CONTROL SYSTEMS

Filed May 22, 1952     5 Sheets-Sheet 5

INVENTORS
HARVARD H. GORRIE
AND JACK F. SHANNON
BY
*Raymond W. Jenkins*
ATTORNEY

United States Patent Office 2,737,963
Patented Mar. 13, 1956

2,737,963
CONTROL SYSTEMS

Harvard H. Gorrie, Cleveland Heights, and Jack F. Shannon, Euclid, Ohio, assignors to Bailey Meter Company, a corporation of Delaware Application May 22, 1952, Serial No. 289,402

3 Claims. (Cl. 137—85)

Our invention relates to systems and apparatus for indicating, recording, or otherwise exhibiting and/or controlling the value of a position, measurement or variable. More particularly, the invention relates to such systems wherein a fluid pressure is established representative of that which is to be measured or controlled, and then the fluid pressure is used to actuate an exhibiting or controlling device.

While not necessarily so limited, the invention is particularly adapted and useful in pneumatic telemetering systems with air under pressure as the active motive fluid. The description of this specification is directed to apparatus employing pressure air, by way of example only.

In accordance with our invention we establish a pneumatic loading pressure corresponding to, or representative of, the value of the position, measurement or variable, and remotely exhibit the magnitude of the loading pressure or use the loading pressure for control purposes.

Our invention is particularly adapted to the telemetering of a value to an adjacent or remote point; or for amplifying the power of a responsive device, such as a Bourdon tube, flow meter, or the like, so that an exhibiting or controlling device may be accurately positioned.

A particular object of the invention is to provide a pneumatically operated power amplifier whereby the available power of the responsive device, such as a Bourdon tube, for positioning an exhibiting means or performnig other useful work, is increased.

Another object is to provide a pneumatically operated telemetering system whereby a value of a variable, the position of a movable member, or the like, may be exhibited at a point remote from the point of measurement.

A further object is to provide apparatus whereby a relatively weak force representative of a variable value, condition, or position is amplified in translation into a pneumatic or similar fluid pressure and the amplified fluid pressure is made available for actuating exhibiting or controlling apparatus relatively adjacent or relatively remote from the measuring means. In this way a sensitive measuring instrument may be located adjacent the point of measurement and the resulting measurement may be amplified and transmitted over considerable distances to a desirable location for exhibiting or controlling apparatus. By transmitting the measurement through the agency of a pneumatic loading pressure, we avoid the many inaccuracies and time lags which have been experienced in the past with systems wherein the measuring instrument itself must of necessity be located on a panel board a considerable distance from the location of the variable which is to be measured.

It will be apparent as the description proceeds that our invention may be put to a wide variety of uses such as for exhibiting the value of a temperature, pressure, relative humidity, electromotive force, or for transmitting commands or other intelligence, all of which are to be considered as coming within the scope of our invention.

It is a particular object of our present invention to provide system and apparatus wherein a substantially standardized type of transmitter is located at the point where the variable is to be measured and establishes a pneumatic pressure thereafter transmitted to a central location and utilized in terms of the variable being measured. In other words, regardless of the nature of value of the variable being transmitted, it is converted at the point of measurement to be within a predetermined relatively low pneumatic pressure range which may be readily transmitted over considerable distances to a central point of use. Such standardization reduces to a minimum the problem of transmitting pressures or other difficult values over considerable distances.

A further object is to provide a telemeter transmitter of universal applicability wherein variables, positions, and the like are converted to within a standard range of air pressure for remote or local telemetering.

Other objects will become evident as the description proceeds.

Figure 1:
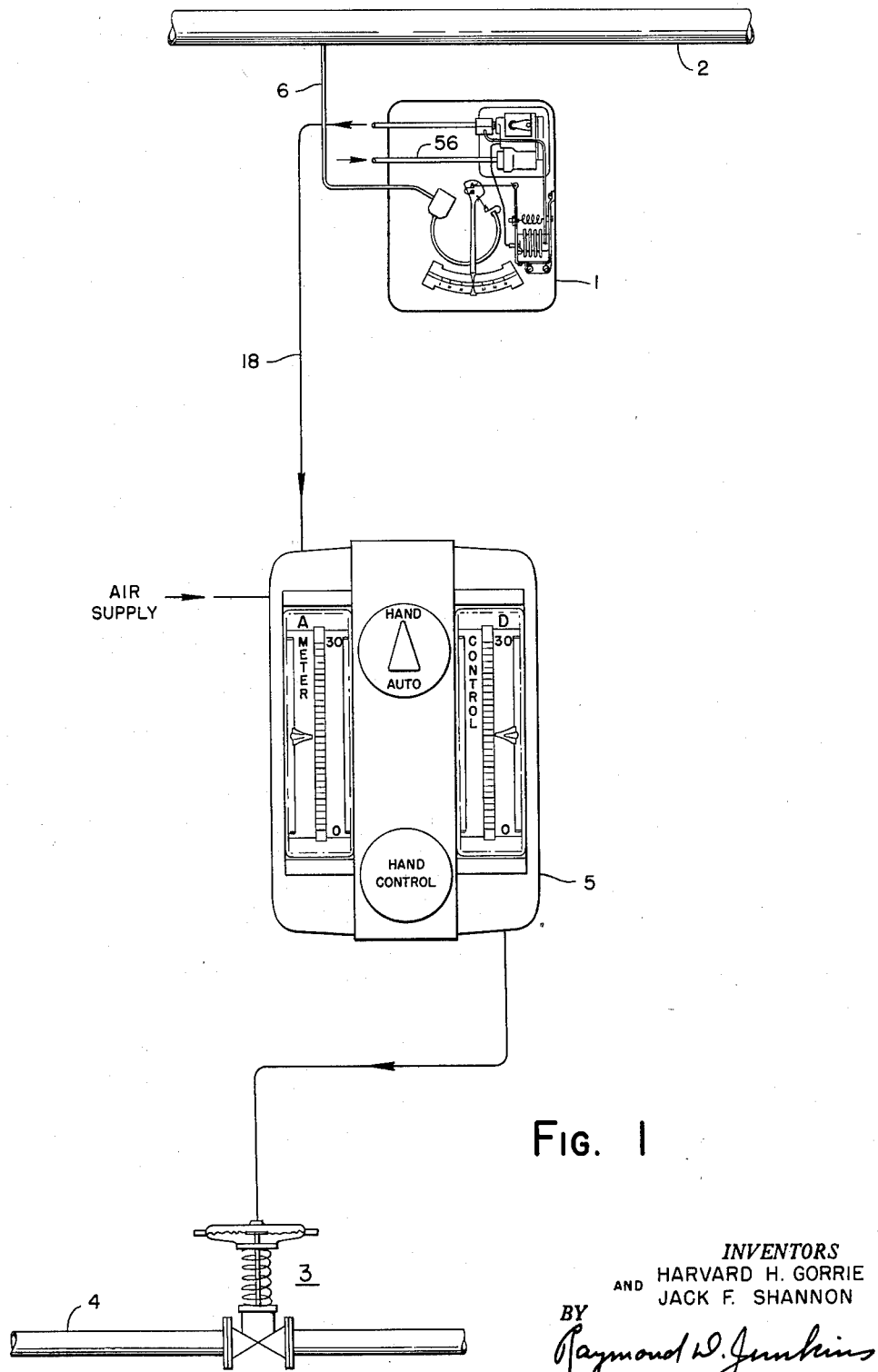
Fig. 1 illustrates our invention embodied in a simple control system.

Referring to Fig. 1, we therein show our invention as incorporated in a pneumatic telemetering system comprising a transmitter, a selector station, and a controller included in an operative fluid control system. The pressure transmitter 1 is desirably located adjacent the point of measurement, in this case close to a fluid flow conduit 2 in which fluid pressure is desirably to be measured and telemetered to a remote location or locations. Under the control of the pressure transmitter 1 is a diaphragm actuated fluid control valve 3 for controlling the rate of flow of a fluid through a conduit 4. The conduit 4 may be in the same system as the conduit 2 or in a different system.

Intermediate the transmitter 1 and the control valve 3 is a selector station 5 which may desirably be located at a control panel remote from the transmitter and from the control valve 3. It is preferably of the type disclosed and claimed in the application of Paul S. Dickey et al. SN 251,406 filed October 15, 1951. Such a pneumatic selector station provides the possibility of having the control valve 3 directly automatically positioned under the dominance of pressure transmitter 1 or selectively to disconnect from the transmitter 1 and allow remote hand positioning of the valve 3.

The particular features of our present invention lie in the transmitter 1 so that the remaining figures of the drawing are devoted to constructional arrangements and details of the transmitter but we include the present Fig. 1 as explanatory of a simple control system in which such a transmitter finds its greatest usefulness. While the booster relay and other features of the present invention will be described in connection with the transmitter 1 it will be understood that they are applicable to other devices such as relays and the like in fluid pressure control or measuring systems.

While the transmitter 1 is illustrated and described as being sensitive to pressure of the fluid within the conduit 2, for establishing a fluid loading pressure within a range of some 5–25 p. s. i., it will be understood that the transmitter may be sensitive to temperature, position or other variable which may be converted into the said range 5–25 p. s. i. for remote or local indication, recordation, or use in control. It will be understood that some other pressure range might equally as well have been chosen. It is important, however, to appreciate that the transmitter 1 is sensitive to a wide variety of variables such as flow, pressure, temperature and the like for converting the same into a standardized telemetering fluid pressure.

Figure 2:
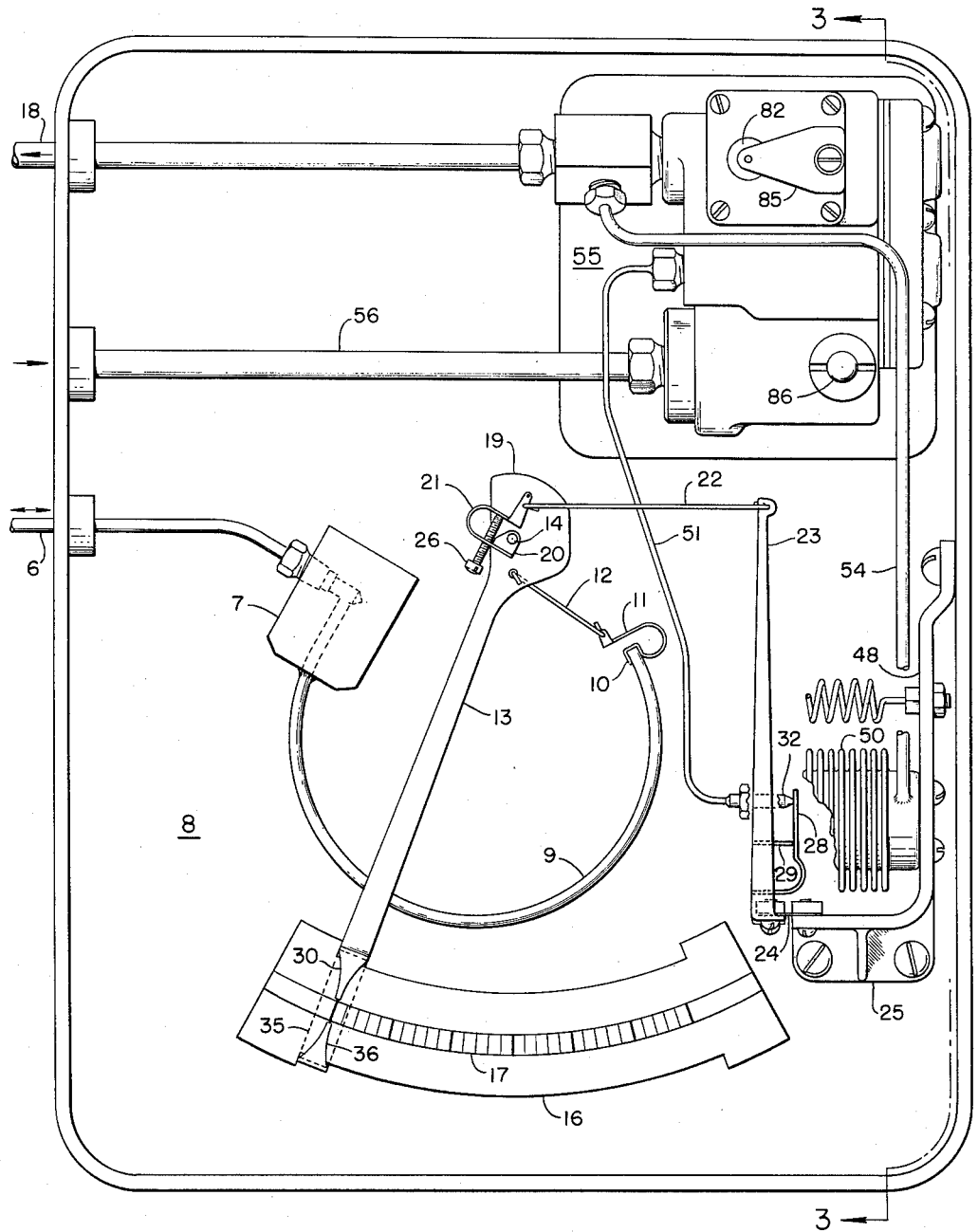
Fig. 2 is a front elevation, with cover removed, of a commercial embodiment of our invention; namely, the pressure transmitter of Fig. 1.
Figure 3:
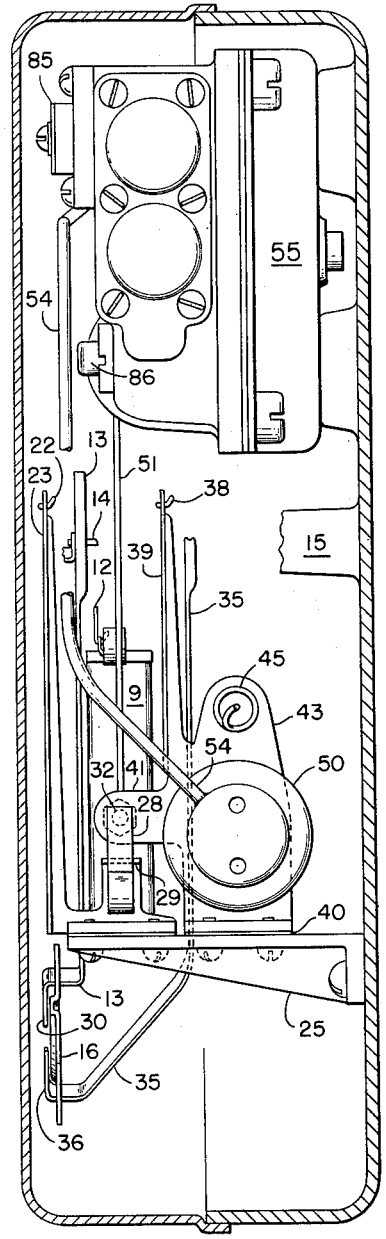
Fig. 3 is a side elevation of the device of Fig. 2.
Figure 4:
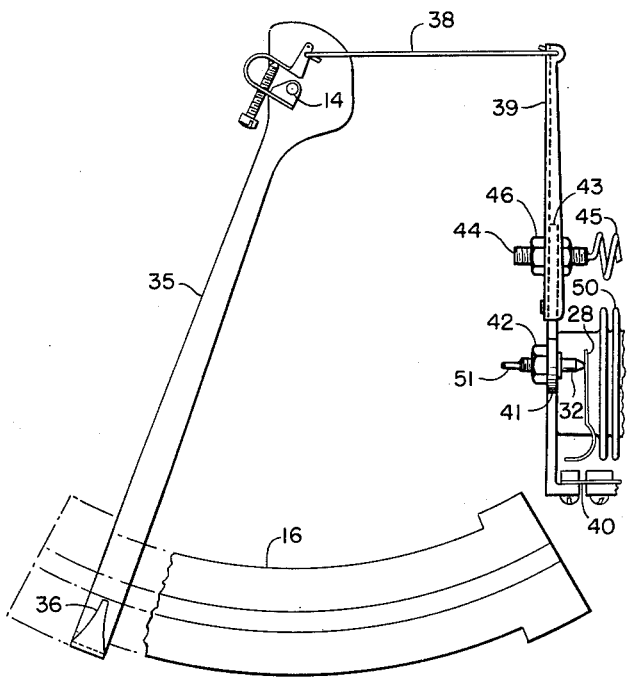
Fig. 4 is a detail of a portion of Fig. 2.

The pressure within the conduit 2 is conveyed to the transmitter 1 by way of a pipe 6 which joins a connection block 7 firmly anchored to the interior of the case 8 of the transmitter. Refer now to Figs. 2, 3 and 4 which show the transmitter assembly to a larger scale.

The variable to be measured and used in control, namely pressure within conduit 2, is effective within a Bourdon tube 9 having one end fixed to the block 7. The free end 10 of the tube 9 is connected by an element 11 and a link 12 to an indicating pointer 13 which is pivoted as at 14 to a fixed abutment 15 of the case 8. In Fig. 3 the shafts and bearings between pivot center 14 and the abutment 15 have been broken away for clarity in viewing other parts.

The pointer 13 is arranged to cooperate with a scale 16 having graduations 17 and the scale may be marked with indicia representative of the variable (pressure in 2) being measured, or in terms of the pneumatic pressure output of the transmitter available in pipe 18 leading to the selector station 5. Fastened to the base 19 of the pointer 13 is one end 20 of a U-shaped drive arm 21 arranged to move a link 22 and thereby a baffle arm 23; the latter pivoted by a leaf spring 24 to a fixed bracket 25. Movement of the link 22 is substantially longitudinal. Angular movement of baffle arm 23 about its pivot 24, relative to angular movement of pointer arm 13 above its pivot 14, may be adjusted by a screw 26. Reference to Fig. 3 will show that the baffle arm 23 is formed to carry a baffle plate 28 normally spring urged to rest against a stop portion 29 of the arm 23.

The assembly of parts just described in connection with Figs. 2 and 3 is shown in a position of rest with atmospheric pressure existing within Bourdon tube 9, and pointer 30 of the arm 13 registering with the minimum graduation of the scale 16. The baffle 28 rests against its stop 29 and in a predetermined position relative to the "normal" cooperating position of an air jet nozzle 32 now to be referred to.

As viewed in Fig. 2, and substantially directly in back of the parts just described in connection therewith, lie the assembly of nozzle positioning parts which we have lifted out to form Fig. 4. A pointer arm 35, having a pointer 36, is arranged to pivot around the previously mentioned center 14. The arm 35 (Fig. 3) travels beneath the scale 16 with the pointer 36 cooperating with the pointer 30 relative to the graduations 17.

The assembly of Fig. 4 has a link 38 connected to a nozzle carrying arm 39 which is pivoted at a leaf spring 40. Whereas in Fig. 2 the link 22 positions the baffle carrying arm 23, in Fig. 4 the link 38 acts to position the arm 35 and pointer 36. The arm 39 is formed with a side extension 41 to which is adjustably clamped the nozzle 32 by means of a lock nut 42. The arm 39 has an enlarged base plate 43 through which is passed the threaded end 44 of a loading spring 45. Lock nuts 46 engage the threads of end 44 to adjust the loading of spring 45, whose other end is adjustably fastened to an arm 48 of the bracket 25.

Also fastened to the arm 48 is one end of a bellows 50 whose other (movable) end rests against the base plate 43 of arm 39. The arrangement provides that the position of the arm 39, 41, 43 about its pivot 40 is determined by the loading pressure within bellows 50 acting to rotate the arm assembly in ccw. direction against the tension loading of spring 45. In Fig. 4 the "normal" position of rest shows the pointer 36 registering with pointer 30 at minimum graduation of 17, and with arm 39 at rest under balance of forces of bellows 50 and spring 45. Actually the pressure within bellows 50 may not be atmospheric but at some predetermined "normal" value that will be mentioned later. Under these conditions of balance and rest, the nozzle 32 will have a normal clearance relative to baffle 28.

Nozzle-baffle couples are not new in this art. When air under pressure is available in the flexible pipe 51 joining the nozzle 32, any departure of the nozzle 32 and baffle 28, one from the other, will result in an increase in bleed of air from pipe 51 to the atmosphere. If the baffle rests against the end of the nozzle then theoretically the nozzle is closed off and no air is bled from the pipe 51 to the atmosphere. If the baffle moves away from the nozzle (or vice versa) a clearance is soon reached allowing unrestricted discharge of air from the pipe 51 limited only by the size of the orifice of the nozzle exit. The range of the couple is the movement necessary between these extremes of air bleed. In the present arrangement this is a distance or spacing of approximately .0005 inch, while the expected travel of the couple is approximately 1/16 inch.

We have mentioned the pipe 51 joining the nozzle 32 and now mention a pipe 54 which joins the bellows 50. The pipes 51 and 54 are connected to a relay assembly 55 shown in outline in Figs. 2 and 3 and joined by pipe 18 as well as by a pipe 56 leading from a source of compressed air under substantially uniform pressure. We will now refer more specifically to Figs. 5, 6, 7, 8 and 9 in describing the construction and operation of the relay assembly 55. It may be noted that the assembly 55, along with the nozzle-baffle couple, form what may be termed a booster relay useful not only in the present transmitter but in various other measuring and controlling instrumentalities.

Figure 5:
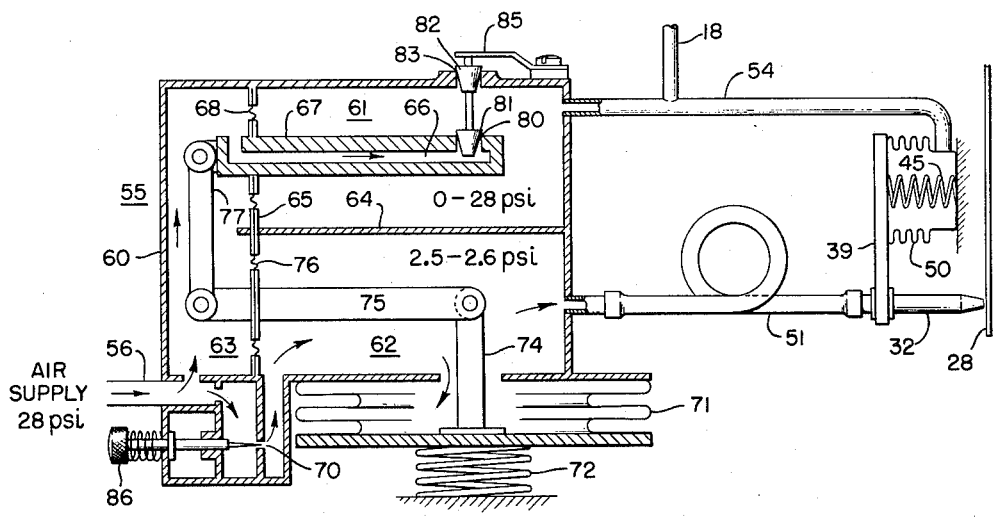
Fig. 5 is a diagrammatic showing of the booster relay of Figs. 2, 3 and 4.
Figure 9:
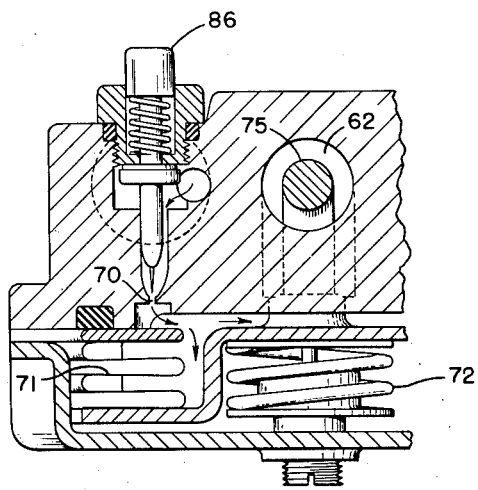
Fig. 9 is a section, along the line 9—9, of Fig. 6, in the direction of the arrows.

Figs. 6–9 are various sectional views of the assembly 55 in its commercial form, while Fig. 5 shows the operating parts in diagrammatic fashion. The description of operation will proceed in connection with Fig. 5 for ready understanding.

Clean, dry, compressed air at a substantially constant pressure of 28 p. s. i. g. is assumed to be available in a supply pipe 56 joining the casing 60 of the relay assembly 55. The casing 60 is divided into three main chambers 61, 62 and 63. Chambers 61 and 62 are separated by a wall 64 while chamber 63 is separated from chambers 61 and 62 by a wall or partition generally indicated at 65.

Air under the supply pressure of 28 p. s. i. is available in chamber 63 and in the passage 66 of a tubular arm 67 which is pivoted through a flexible diaphragm 68 inserted in the wall 65. Chamber 62 is supplied with air from the 28 p. s. i. supply through a fixed orifice 70 in the wall 65; the orifice being sized to allow a flow to chamber 62 at a rate of approximately .04 C. F. M. under normal pressure conditions within chamber 62 of 2.5–2.6 p. s. i.

Chamber 62 communicates with the interior of a bellows 71 which is loaded by a spring 72. The movable wall of the bellows is arranged to position a push-rod 74 to angularly move an arm 75 about its pivot diaphragm 76 located in the wall 65 in alignment with the pivot sealing diaphragm 68. One end of arm 75 is pivoted to a link 77 (in chamber 63) and the other end of link 77 is pivotally connected to an end of tubular arm 67. It will thus be seen that upward movement of rod 74 (in Fig. 5) will result in ccw. movement of rod 75 about its pivot plate 76, downward movement of link 77, and ccw. movement of tubular arm 67 about its pivot plate 68; the angular movement of members 75 and 67 being substantially equal and in the same direction. Downward movement of rod 74 results in cw. movement of members 75 and 67.

Movement of arm 67 clockwise from the position shown in Fig. 5 results in the valve seat 80 moving away from a valve member 81 with consequent entry of 28 p. s. i. supply air, from chamber 63 and passage 66, into the interior of chamber 61. Movement of arm 67 upwardly from the position shown in Fig. 5 retains the valve 81 seated at 80 but lifts exhaust valve 82 from its seat 83 to allow air from chamber 61 to bleed to the atmosphere. Thus angular positioning of arm 67, about its pivot plate 68, controls the supply of pressure air to chamber 61 and the bleed of air therefrom. The range of pressure in chamber 61 is 0–28 p. s. i. because the chamber may bleed down to atmospheric pressure or may build up to supply pressure.

The resultant, or output pressure of the booster relay 55, available in chamber 61, is effective in the output pipe 18 for positioning the control valve 3 and remotely indicating the value of the variable on scale A of selector station 5, and at the same time is effective within a restoring bellows 50 which positions the nozzle carrying arm 39, nozzle 32, and pointer 35, 36.

The valve assembly including valves 81, 82 is urged in a downward (seating) direction by a leaf spring 85 which is strong enough to seat the valves against the effective air pressures but is weak enough to be readily overcome by upward movement of seat 80 under the power of bellows 71. A spring retracted plunger 86 carries a needle end arranged to cooperate with the orifice 70 for cleaning the latter of any dirt or other matter which might tend to vary its discharge area.

Other figures of the drawing will show a more nearly actual arrangement of the parts as well as possibilities of adjustment not shown in the quite diagrammatic arrangement of Fig. 5.

It will now be seen that the over-all operation of the apparatus is as follows. Assume that the system of Fig. 1 is in balance and that pressure within conduit 2 is at a desired value of 100 p. s. i. Also that the range of transmitter 1 is 0–200 p. s. i. in which case the graduations 17 of scale 16 would be 0–200 p. s. i. for pressure measuring pointer 13, 30 and the pointer 30 would be indicating at one-half scale (100 p. s. i.). To correspond to the range 0–200 p. s. i. the transmitter is arranged to develop an equivalent or representative air loading pressure range of 5–25 p. s. i. in output pipe 18. With the system in balance the pointer 36 would be at graduation 15 p. s. i. of a 5–25 scale 17 and register exactly with pointer 30. In other words, scale 16 would be graduated 0–200 p. s. i. and also 5–25 p. s. i., and under the conditions of balance stated, the pointer 36 would indicate an output pressure in pipe 18 of 15 p. s. i. (one half the range 5–25) while the measuring pointer 30 indicated a pressure of 100 p. s. i. in conduit 2. At any point along scale 17, if the system is in balance and the two pointers are registering together, the established output pressure in pipe 18 is indicative of, and representative of, the variable being measured. Any variable condition, quantity, or position may actuate the transmitter (and be indicated by pointer 30) to establish a pneumatic loading pressure in pipe 18 (indicated by pointer 36) proportional to and representative of the measured variable.

Assume that, for some reason, pressure within conduit 2 should decrease from 100 p. s. i., thus upsetting the system balance and calling for a repositioning of control valve 3. A decrease in pressure within Bourdon tube 9 causes the tube to contract, moving pointer arm 13 in cw. rotation about its pivot 14, and moving baffle arm 23 in cw. rotation about its pivot 24. Such movement carries baffle 28 away from the tip of nozzle 32, increasing the bleed of air from pipe 51 and chamber 62 to the atmosphere, and lowering the pressure in bellows 71. This results in an upward movement of rod 74 and ccw. movement of arm 67, lifting valve 82 from its seat 83 and bleeding air from the chamber 61 to the atmosphere. The pressure within chamber 61 is lowered from its previous value, as is the pressure in output pipe 18 and in the restoring bellows 50. If the system of Fig. 1 is so arranged that a positioning of regulating valve 3 will tend to restore pressure within conduit 2 to a predetermined value (say 100 p. s. i.) then the lowering of pressure within pipe 18 will cause movement of the valve 3 in proper direction to return the departed conduit 2 pressure to the desired value of 100 p. s. i.

The new (or changing) value of pressure in chamber 61 is simultaneously effective within the restoring bellows 50, tending to weaken the same with reference to the loading spring 45, to the end that nozzle arm 39 moves cw. about its pivot 40, causing the nozzle 32 to "follow up" the cw. movement of the baffle 28 previously referred to; and also moves pointer 36 to follow-up the previous departure of pointer 30. If the change in conduit 2 pressure is slow enough the follow-up will occur substantially simultaneously with a minimum of lag between the dictating and the follow up parts.

A change in pressure within conduit 2 in the other direction, namely, an increase above 100 p. s. i., will result in pointer 30 and baffle arm 23 moving ccw. (Fig. 2) and baffle 28 approaching the nozzle 32. Such approach causes the nozzle bleed to decrease and the pressure in chamber 62 to increase, thereby expanding bellows 71 and moving seat 80 downward away from the valve 81. Spring 85 holds the valve 82 seated at 83 and the pressure in chamber 61 tends to build up. This increasing pressure is effective in positioning control valve 3 in proper direction, and the increased pressure is also effective in restoring bellows 50 to move the nozzle in follow-up direction relative to the approaching baffle. Each change in the measured variable produces a change in baffle position which initiates an output pressure change resulting in a follow-up movement of the nozzle.

The nozzle 32 preferably has a capillary opening approximately 1/32 inch in diameter and approximately 3/16 inch in length. The movable head of the bellows 50, positioning the nozzle 32, has a total movement of about 1/16 inch for a pressure change of 0–28 p. s. i. within the bellows. When there exists a pressure of 2.5 p. s. i. within chamber 62 and bellows 71, the loading of spring 72 is so adjusted that the system is in balance and both valves 81 and 82 are closed. This is a condition depicted in Fig. 5. There is about .003 inch clearance between the baffle and the nozzle and the bleed therefrom is enough to maintain the 2.5 p. s. i. pressure in chamber 62 and bellows 71 with a supply pressure of 28 p. s. i. at the inlet side of the orifice 70. Full range (0–200 p. s. i.) movement of the Bourdon tube results in a baffle movement of approximately 1/16 inch. A change in baffle position, relative to the nozzle 32, of .0001 inch will produce a change of pressure within the chamber 62 of approximately .1 p. s. i. (from 2.5 to 2.6).

From these values it will be seen that the booster relay is sensitive to less than .0001 inch baffle (or nozzle) movement because .0001 inch movement of one relative to the other will produce a .1 p. s. i. change in pressure in chamber 62 to produce a pressure change of 20 p. s. i. (5–25) in bellows 50 which represents a movement of the nozzle of 1/16 inch (.0625). Thus the system has an over-all motion amplification of .0001 to .0625 or 625 to 1 and an over-all pressure amplification of .1 p. s. i. to 20 p. s. i. or 200 to 1. These values are approximate and depend upon design and other variables but they are given as representative of the order of magnification possible with the construction and arrangement of the invention as embodied in the described example.

Referring now to Figs. 6, 7, 8 and 9 we show therein sectional views to substantially actual size (in the printed copy of the patent) of a commercial relay 55 to which we have applied the same reference numerals as used in connection with the diagrammatic drawing of Fig. 5.

Figure 6:
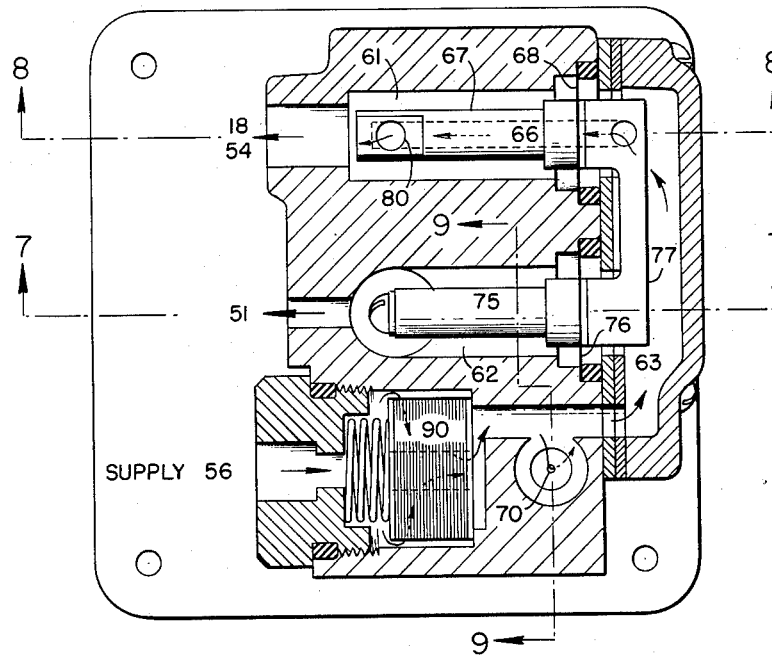
Fig. 6 is a plan view of the relay of Fig. 2 with a portion sectioned along the line 6—6 of Fig. 7, in the direction of the arrows.
Figure 7:
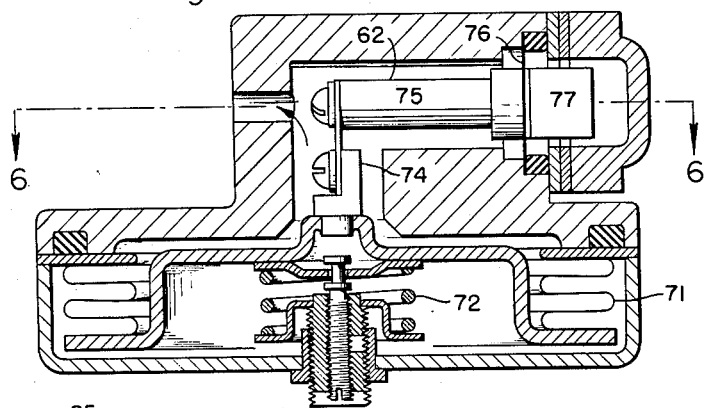
Fig. 7 is a section, along the line 7—7, of Fig. 6, in the direction of the arrows.
Figure 8:
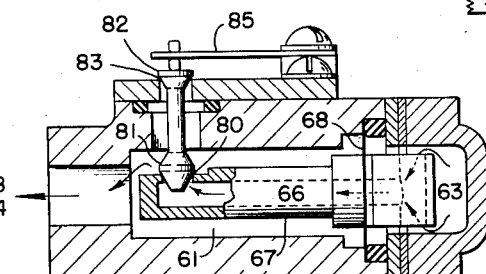
Fig. 8 is a section, along the line 8—8, of Fig. 6, in the direction of the arrows.

Fig. 6 shows the air supply pipe 56 entering the assembly with the air first passing through a removable filter 90 to enter the chamber 63 and the fixed orifice 70. It is believed that the cooperation of the various parts and intercommunication of the various air channels, in Figs. 6, 7, 8 and 9, will be clearly understandable with reference to the diagrammatic Fig. 5 previously explained.

The booster relay 55 is a high capacity relay incorporating positive seating air valves. It gives high sensitivity, accuracy, and capacity, with a normal consumption of less than .1 cu. ft. of free air per min. over all. A Bourdon tube indicating device actuates a baffle restricting the flow of air from a nozzle supplied with low pressure air. Motion of the baffle increases or decreases the pressure in the nozzle supply line which actuates the booster relay which in turn develops the loading pressure signal. This loading pressure signal is transmitted, simultaneously, to a restoring bellows which causes the nozzle to follow the baffle position and to the loading pressure line. Since this restoring bellows is accurately calibrated to produce a definite nozzle position for each air loading pressure and since the nozzle must follow the baffle at all times, a definite loading pressure signal is obtained for each baffle position and each value of the measuring instrument driving the baffle.

A particular advantage of the relay 55 is that, at balance, the valves 80—81 and 82—83 are close seated, using no air at balance except for the continuous leak-off between the nozzle 32 and baffle 28 which amounts to about .04 C. F. M. The transmitter has 100% proportional band, i. e. full motion for 5–25 p. s. i. output. Furthermore, the combination of nozzle, baffle, and booster relay 55 is substantially self-compensating for variations in supply pressure; normally encountered variations in supply pressure, plus or minus from 28 p. s. i., are of minute effect upon the over-all accuracy.

It will be understood that we have chosen to illustrate and describe certain preferred embodiments of our invention, as examples only, and do not expect to be limited thereby.

What we claim as new, and desire to secure by Letters Patent of the United States, is:

1. A fluid pressure amplifier including; a fluid pressure-mechanical couple urged toward closure by a substantially constant force which is balanced by the output fluid pressure; a first chamber supplied with a substantially constant fluid pressure; a second chamber supplying the fluid pressure of the couple and including, a fixed orifice connecting it with the first chamber, a flexible wall, and an expansible wall restrained by a spring; a third chamber supplying the output fluid pressure and including, a flexible wall, and a first valve venting the chamber to atmosphere; and a rigid link member connecting the expansible wall of the second chamber with the first valve of the third chamber through the flexible walls of the chambers as pivots and having a passage through a portion of the link communicating the first chamber with the third chamber through a second valve connected to the first valve, the valves arranged to vent the third chamber either to atmosphere or to the first chamber under the direction of the expansible wall.

2. A fluid pressure amplifier including; a fluid pressure-mechanical couple urged toward closure by a substantially constant force which is balanced by the output fluid pressure; a first chamber supplied with a substantially constant fluid pressure; a second chamber supplying the fluid pressure of the couple and including, a fixed orifice connecting it with the first chamber, a flexible wall, and an expansible wall restrained by a spring; a third chamber supplying the output fluid pressure and including, a flexible wall, and a movable seat valve member for venting the chamber to atmosphere; linkage means including a movable valve seat connecting the expansible wall of the second chamber with the valve seat of the third chamber through their flexible walls as pivots and having a passage through a portion of the link communicating the first chamber with the third chamber through the valve seat, a valve member cooperating with both valve seats, the linkage means arranged to actuate the valve member to vent the third chamber either to atmosphere or to the first chamber under the direction of the expansible wall.

3. A pressure amplifier including; a fluid pressure-mechanical couple urged toward closure by a substantially constant force which is balanced by the output fluid pressure; a first chamber supplied with a substantially constant fluid pressure; a second chamber supplying the fluid pressure of the couple and including, a fixed orifice connecting it with the first chamber, a flexible wall, and an expansible wall restrained by a spring; a third chamber supplying the output fluid pressure and including, a flexible wall, a first valve venting the third chamber to atmosphere, and a second valve venting the third chamber to the first chamber; and a rigid link member connecting the expansible wall of the second chamber with both valves through the flexible walls of the chambers as pivots.

References Cited in the file of this patent

UNITED STATES PATENTS

| | | |
|---|---|---|
| Re. 20,092 | Mason | Sept. 1, 1936 |
| 1,992,048 | Temple | Feb. 19, 1935 |
| 2,009,711 | Mateer | July 30, 1935 |
| 2,461,026 | Bilyeu | Feb. 8, 1949 |
| 2,507,606 | McLeod | May 16, 1950 |
| 2,593,129 | Fischer | Apr. 15, 1952 |

FOREIGN PATENTS

| | | |
|---|---|---|
| 562,645 | Great Britain | July 11, 1944 |